United States Patent
Gesner et al.

(10) Patent No.: US 7,859,649 B2
(45) Date of Patent: Dec. 28, 2010

(54) LASER RANGE SENSOR SYSTEM OPTICS ADAPTER AND METHOD

(75) Inventors: Eric G. Gesner, Webster, NY (US); David B. Kay, Rochester, NY (US); Mehdi N. Araghi, Webster, NY (US)

(73) Assignee: Quality Vision International, Inc., Rochester, NY (US)

( * ) Notice: Subject to any disclaimer, the term of this patent is extended or adjusted under 35 U.S.C. 154(b) by 421 days.

(21) Appl. No.: 11/741,129

(22) Filed: Apr. 27, 2007

(65) Prior Publication Data

US 2007/0258709 A1 Nov. 8, 2007

Related U.S. Application Data

(60) Provisional application No. 60/746,260, filed on May 2, 2006.

(51) Int. Cl.
*G01C 3/08* (2006.01)
(52) U.S. Cl. .................. 356/4.01; 356/3.01; 356/3.15; 356/4.1; 356/5.15
(58) Field of Classification Search ....... 356/3.01–3.15, 356/4.01–4.1, 5.01–5.15, 6–22
See application file for complete search history.

(56) References Cited

U.S. PATENT DOCUMENTS

| | | | | |
|---|---|---|---|---|
| 4,455,065 | A | * 6/1984 | Niwa et al. | ........... 359/726 |
| 5,298,971 | A | 3/1994 | Huang et al. | |
| 5,689,339 | A | * 11/1997 | Ota et al. | ........... 356/401 |

(Continued)

FOREIGN PATENT DOCUMENTS

| | | |
|---|---|---|
| EP | 0627643 A2 | 12/1994 |
| JP | 2003294412 A | 10/2003 |
| JP | 2003329408 A | 11/2003 |
| WO | 2005121707 A2 | 12/2005 |

OTHER PUBLICATIONS

English Summary of Office Action and Pending Claims (Appendix A and B) in corresponding Chinese Patent Application No. 200780023879.X, filed Apr. 27, 2007 (10 pages).

(Continued)

*Primary Examiner*—Thomas H Tarcza
*Assistant Examiner*—Luke D Ratcliffe
(74) *Attorney, Agent, or Firm*—Harter Secrest & Emery LLP; Stephen B. Salai, Esq.; Brian B. Shaw, Esq.

(57) ABSTRACT

An adapter and method for through the lens (TTL) laser range sensor probes enables use of a TTL probe of a given exit pupil size to be used with a shared objective lens requiring a entrance pupil size, as entered from the laser range sensor, that is different from the TTL probe exit pupil size. Embodiments of the adapter include optics, such as a first lens and a resolving second lens that expand or contract the TTL laser radiation depending on whether the first lens is a diverging, a negative focal length lens, or a converging, positive focal length lens, and the second lens is converging or diverging, respectively, in a Galilean arrangement. Embodiments also provide a Keplerian arrangement, can function with non-collimated radiation, and can include mirrors to yield a more compact adapter. Additional embodiments include at least one adjustable lens element between the first and second lenses, the at least one adjustable lens element being connected to an actuator for movement along the optical path. The adapter can be arranged in a folded configuration in which mirrors are used to form a more compact adapter.

32 Claims, 8 Drawing Sheets

U.S. PATENT DOCUMENTS

| | | |
|---|---|---|
| 5,923,427 A | 7/1999 | Dong |
| 6,004,314 A | 12/1999 | Wei et al. |
| 6,101,267 A | 8/2000 | Shiraishi |
| 6,122,039 A | 9/2000 | Schumacher |
| 6,480,266 B2 * | 11/2002 | Shirai et al. .................. 356/5.1 |
| 6,497,483 B2 | 12/2002 | Frey et al. |
| 2002/0159030 A1 | 10/2002 | Frey et al. |
| 2004/0051711 A1 | 3/2004 | Dimsdale et al. |
| 2004/0119978 A1 * | 6/2004 | Borden et al. ............... 356/432 |
| 2005/0206874 A1 * | 9/2005 | Dougherty ................. 356/4.05 |

OTHER PUBLICATIONS

Supplementary Search Report in corresponding European Patent Application No. 07761467.5, filed Apr. 27, 2007 (6 pages).

* cited by examiner

LASER RANGE SENSOR SYSTEM OPTICS ADAPTER AND METHOD

CROSS-REFERENCE AND PRIORITY CLAIM TO RELATED APPLICATIONS

This application claims benefit of and priority to U.S. Provisional Patent Application No. 60/746,260, filed 2 May 2006, the disclosure of which is hereby incorporated by reference in its entirety.

BACKGROUND AND SUMMARY

Embodiments relate to the field of optical metrology, which uses video based inspection systems, coordinate measuring machines, and multisensor coordinate metrology in the measurement of form, size, and location in production and quality control. An example of such a video inspection system is described in U.S. Pat. No. 6,518,996, the disclosure of which is hereby incorporated by reference. The '996 patent discloses a video inspection apparatus including a compact Y-Z-X measurement axes system with imaging optics and a video camera mounted to the vertical Z translation axis. This vertical imaging system can take the form of a shared objective lens above the X-Y stage, followed by a zoom optical system, followed by a CCD video camera. On some systems, the objective lens can be shared with a laser range sensor system to provide a Through the Lens (TTL) laser range measurement capability on the same object being viewed by the video camera. Thus, more specifically, embodiments relate to TTL laser range sensor systems used with optical metrology systems.

Two examples of laser range sensor systems that can be deployed through the lens include triangulation laser range sensors based on the principles contained in U.S. Pat. No. 4,595,829 and conoscopic holographic sensors taught in U.S. Pat. No. 5,953,137, the disclosures of which are hereby incorporated by reference. A TTL triangulation sensor product is manufactured by Quality Vision International, Inc., Rochester, N.Y., for their inspection and measurement systems and their subsidiaries' equipment. Usually in such TTL triangulation sensors, laser light is directed to the object or surface through one half of the objective lens' entrance pupil. Here, we refer to the objective lens' "entrance" pupil since light is entering from the laser range sensor. The same pupil can also function as the "exit" pupil as will be seen below. Once the light strikes the object or surface, it is reflected and scattered, and the scattered and reflected light passes back through the other half of the objective lens previous entrance pupil, as the pupil becomes an exit pupil for the scattered and reflected light returning to the laser range sensor for detection. In conoscopic sensor products, such as that sold by Optimet or Optical Metrology, Ltd., located in Jerusalem, Israel, light passing back through the entire objective lens, now the exit pupil, is used in the detection process. Because of the different ways in which the TTL sensors use the objective lens aperture and its associated pupils, we refer to the need for the laser range sensor optical system exit pupil to fill the entrance pupil of the objective lens. For statements contained herein, and as the definition, the objective lens entrance pupil is the image of the objective lens aperture stop as "seen" by light that is entering from the laser range sensor. Neither the laser range sensor radiation beam diameter nor the reflected and scattered return beam diameters necessarily represent the exact diameter of the pupil, as the degree to which the beam should be filling the pupil depends on the particular TTL sensor used. It should also be noted that not all TTL sensor systems collimate the radiation they employ.

Figure 1:
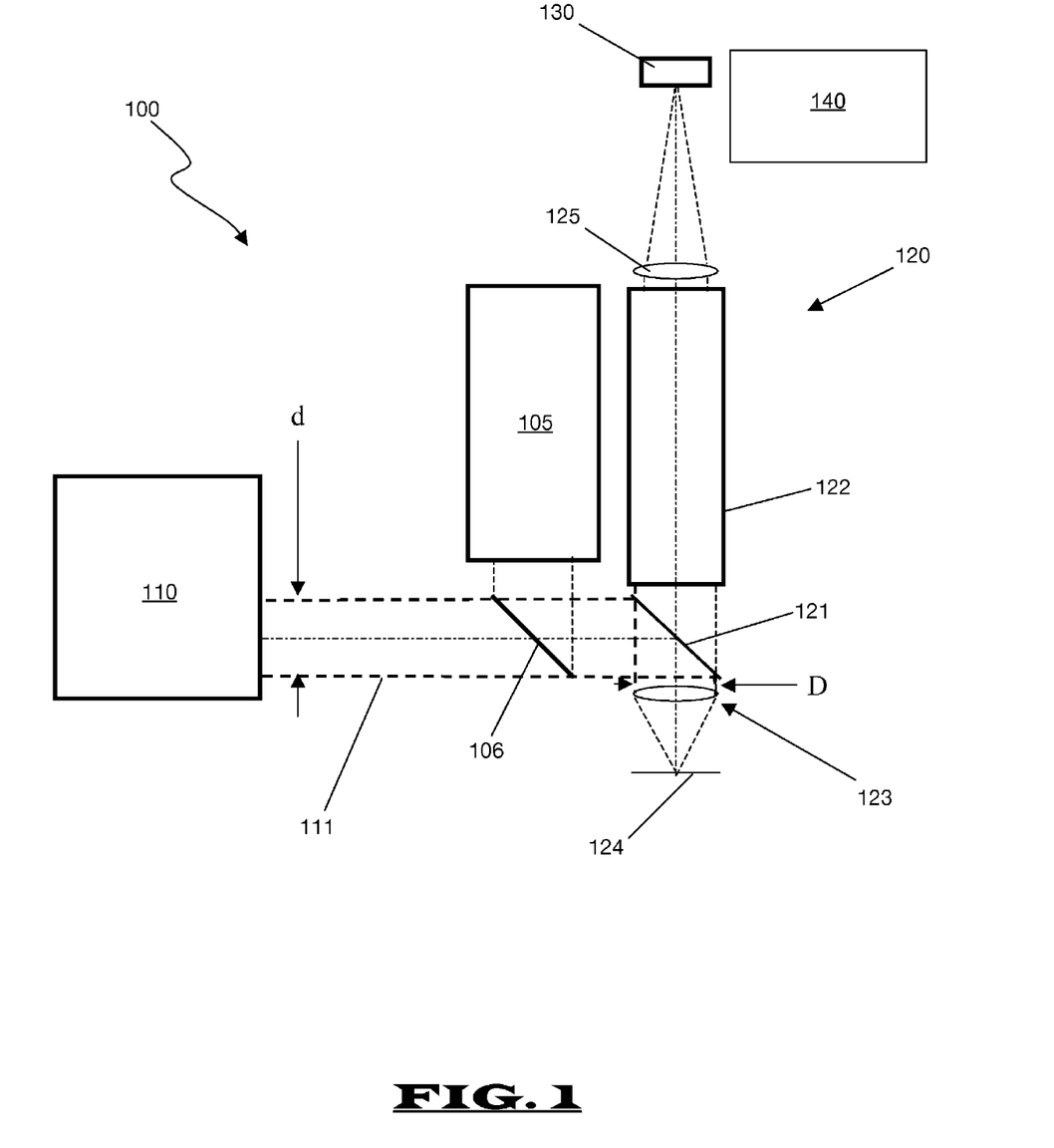
FIG. 1 shows a schematic representation of a typical inspection and measuring system using a TTL laser range sensor and an optical zoom imaging system sharing an objective lens.

TTL laser probes are typically designed to be used with a specific objective lens entrance pupil size, as light enters from the laser range sensor. A typical inspection and/or measuring system 100 using a TTL laser probe arrangement 110 is shown in FIG. 1. The measuring system 100 typically includes an illumination source 105 that provides illuminating radiation to the system 100 via a beam splitter or the like 106. The probe system 110 emits a laser beam 111 toward the optical system 120, which can include a beam splitter 121, a zoom lens system 122, and an objective lens 123 that focuses radiation on an object or surface to be examined 124. The measuring system can further include an image sensor lens 125 that focuses light reflected from the object or surface to be examined 124 onto a sensor 130. The sensor 130 can be the sensor of a CCD camera 140.

As shown in FIG. 1, the beam 111 of diameter d is preferably equal to an exit pupil size of the TTL laser probe 110, and is preferably designed to fill the objective lens entrance pupil of diameter D, which must be properly filled by the radiation from the probe and the returning reflected and scattered light for optimum performance. The degree of performance sensitivity to filling of the entrance pupil depends on the particular laser probe employed. If a different objective lens with a different entrance pupil, as entered from the laser range sensor, is to be used, the laser sensor wilt operate at less than its optimum performance, particularly in height measurement sensitivity, range, resolution, and accuracy. To achieve optimum performance for a given objective lens, the laser range sensor should be redesigned to match the new diameter of the objective lens and the resulting new entrance pupil size. Redesigning the laser probe every time the objective lens' entrance pupil, as entered from the laser range sensor, is changed is costly and cumbersome. There thus exists a need for a more flexible TTL laser probe that can be used with more than one objective lens pupil size.

Embodiments provide a method of changing TTL sensor radiation exit pupil size using an expansion/contraction optical system as an adapter to properly fill an objective lens entrance pupil for which the TTL sensor was not designed. The preferred adapter is based on a Galilean optical system, though a Keplerian optical arrangement can be employed. With the adapter installed, optimum performance of the laser probe in height sensitivity, range, resolution, and accuracy can be achieved without changing the laser probe's optical system design, saving time and money. Embodiments will expand or contract the TTL sensor system radiation as desired for TTL sensor system radiation that is collimated or non-collimated.

DESCRIPTION

Figure 2:
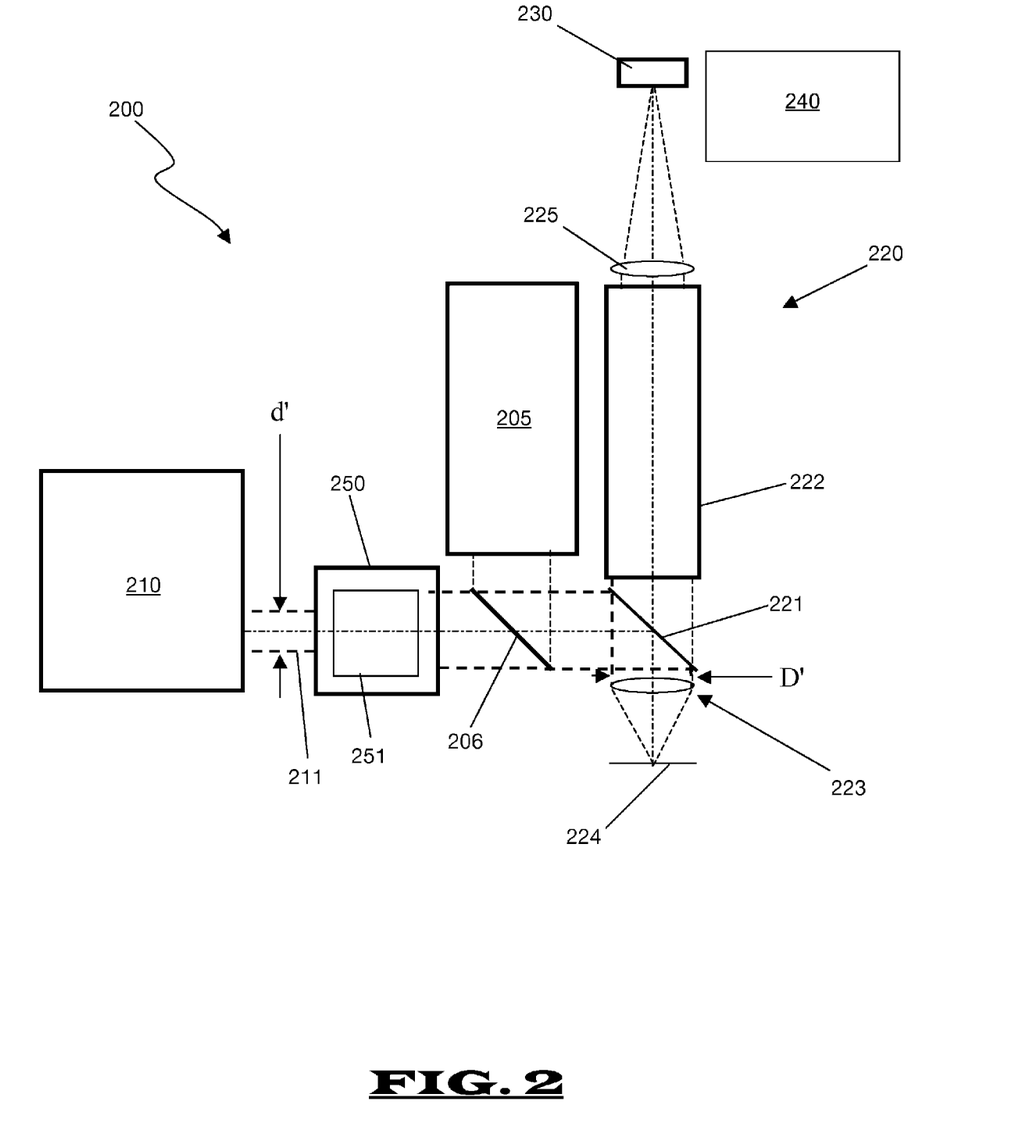
FIG. 2 shows a schematic representation of a inspection and measuring system using a TTL laser range sensor and an optical zoom imaging system sharing an objective lens with the laser range sensor optics adaptor according to embodiments.

As schematically represented in FIG. 2, a metrology system 200 can include an illumination source 205 whose radiation is directed toward an illumination beam splitter or the like 206 which diverts the radiation toward an optical system 220. The metrology system 200 can also include a TTL laser range sensor probe 210 that is directed through the illumination beam splitter 206 to the optical system 220. The radiation from the illumination source 205 and/or the TTL probe 210 is directed to a surface to be measured 224 via a main beam splitter 221 and objective lens 223 of the optical system 220 as in the typical system shown in FIG. 1. A portion of the reflected and scattered illumination light from the object or surface 224 passes through the beam splitter 221 and on to a zoom lens 222, which sends the radiation through sensor lens 225 to the image sensor 230, such as the sensor of a CCD camera 240. Another portion of the reflected and scattered illumination light returns to the TTL probe 210.

As described with respect to the typical arrangement of FIG. 1, the objective lens 223 has an entrance pupil diameter D' that must be properly filled by the radiation beam 211 emanating from the laser in the TTL probe system 210 for optimum resolution and accuracy of measurement. However, when the TTL laser probe 210 is designed for a different objective lens than that installed in the system 200, the probe 210 emits and collects radiation 211 of sensor radiation diameter d' that is not properly sized for the entrance pupil diameter D'. The entrance objective lens pupil for the light emanating from the TTL probe becomes the exit pupil for the return beam of radiation reflected and scattered from the object 224. The return beam is conveyed through what "to it" is the objective lens exit pupil for detection in the laser range sensor.

Figure 3:
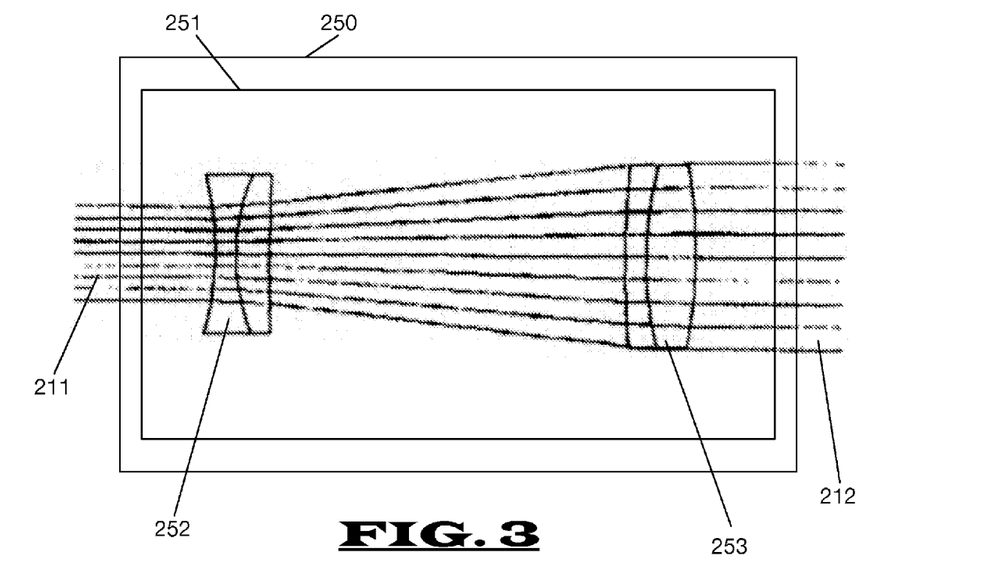
FIG. 3 shows a schematic representation of a beam expander according to embodiments.

Embodiments place a laser range sensor optics adapter 250 between the TTL probe system 210 and the objective lens 223. Preferably, the adapter 250 is placed between the TTL probe system 210 and its entry point into the optical system 220 with which the probe 210 is to be used. The adapter 250 includes optics 251 that expand or contract the radiation emitted from the exit pupil of diameter d' to fill the objective lens entrance pupil of diameter D'. In embodiments, as seen in FIG. 3, the adapter optics 251 can include a first lens 252 that diverges the radiation 211 produced by the TTL system 210.

Figure 4:
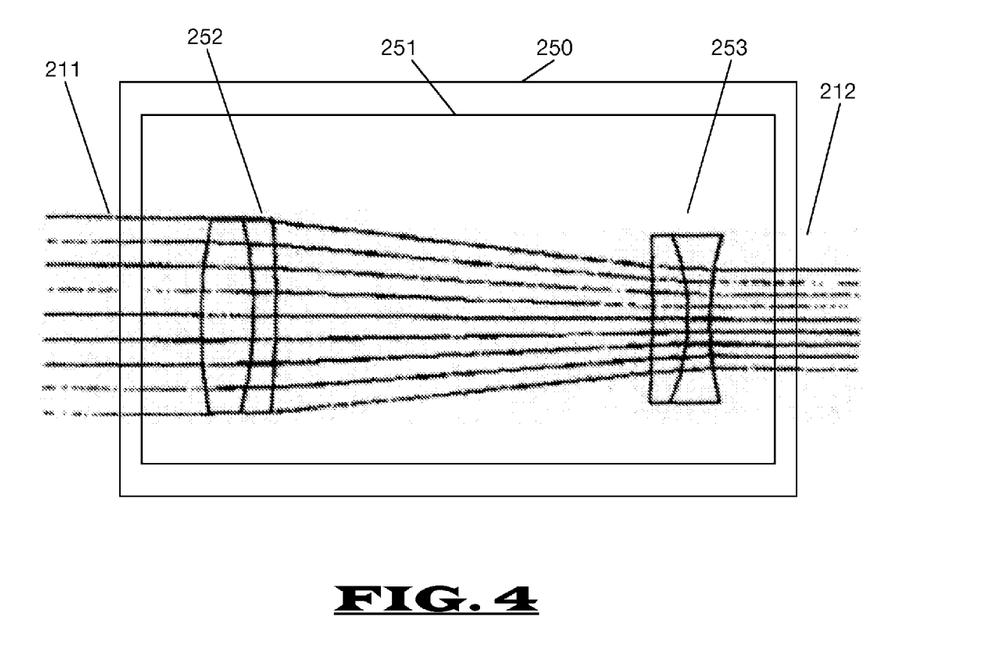
FIG. 4 shows a schematic representation of a beam contractor according to embodiments.
Figure 5:
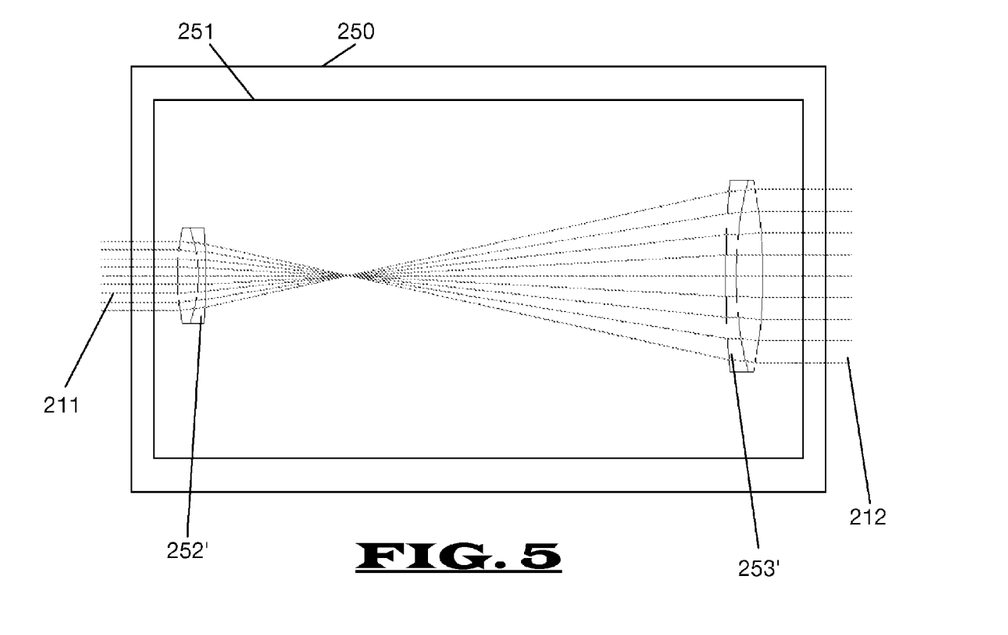
FIG. 5 shows a schematic representation of a beam expander according to embodiments.
Figure 6:
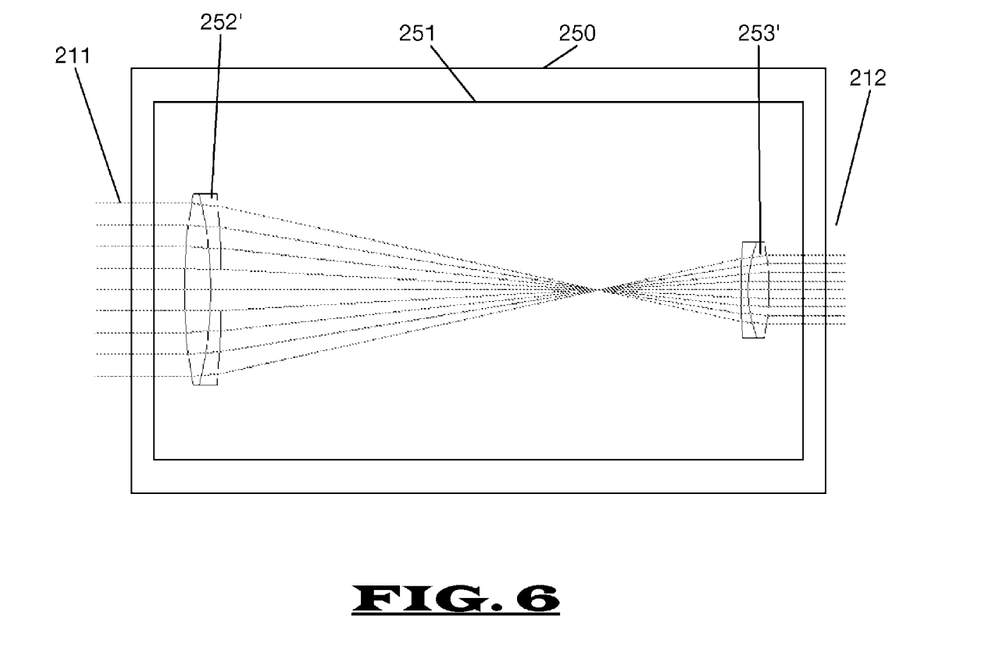
FIG. 6 shows a schematic representation of a beam contractor according to embodiments.

A second lens 253 receives the diverged radiation 212 and resolves the radiation at the desired entrance pupil-diameter D'. As shown in FIG. 3, the first lens 252 can be a diverging lens, defined as a negative focal length lens, that can expand the TTL system radiation 211 to match a larger objective lens 223, such as that seen in FIG. 2. Alternatively, as shown in FIG. 4, the first lens 252 can be a converging lens, defined as a positive focal length lens, and the second, resolving lens 253 can be a diverging lens, defined as a negative focal length lens, thus contracting the TTL radiation to match a smaller objective lens entrance pupil diameter. In addition to the Galilean type arrangement of the lenses 252, 253, embodiments can employ a Keplerian type beam expander or contactor, as seen, for example, in FIGS. 5 and 6. In such an arrangement, two converging lenses 252', 253', defined as positive focal length lenses, are employed with an intermediate focus therebetween. While the Keplerian arrangement eliminates the need for diverging lenses in the adapter optics 251, the intermediate focus usually undesirably lengthens the optics. Thus, a Galileo arrangement as shown in FIGS. 3 and 4 should be used when shorter or more compact optics are desired. It should be noted that embodiments are fully functional with non collimating variations of TTL laser range sensors as shown, for example, in FIG. 7.

Figure 8:
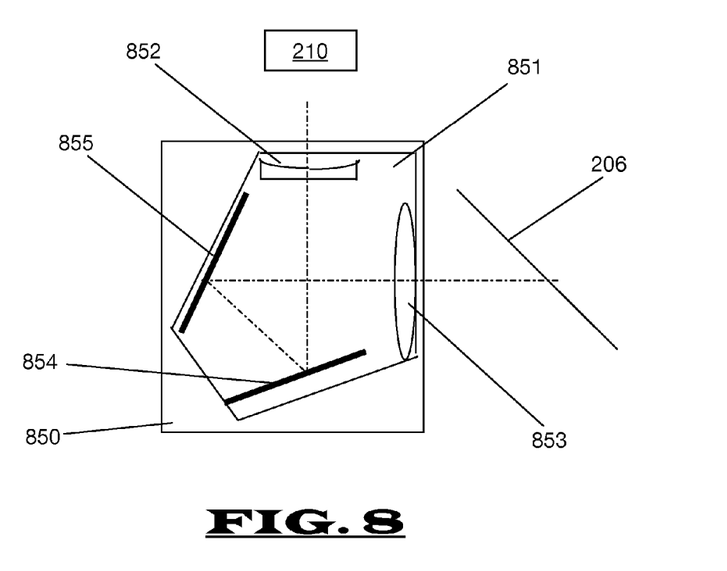
FIG. 8 shows a schematic representation of an adapter according to embodiments and including mirrors to "fold" the adapter into a more compact form.
Figure 9:
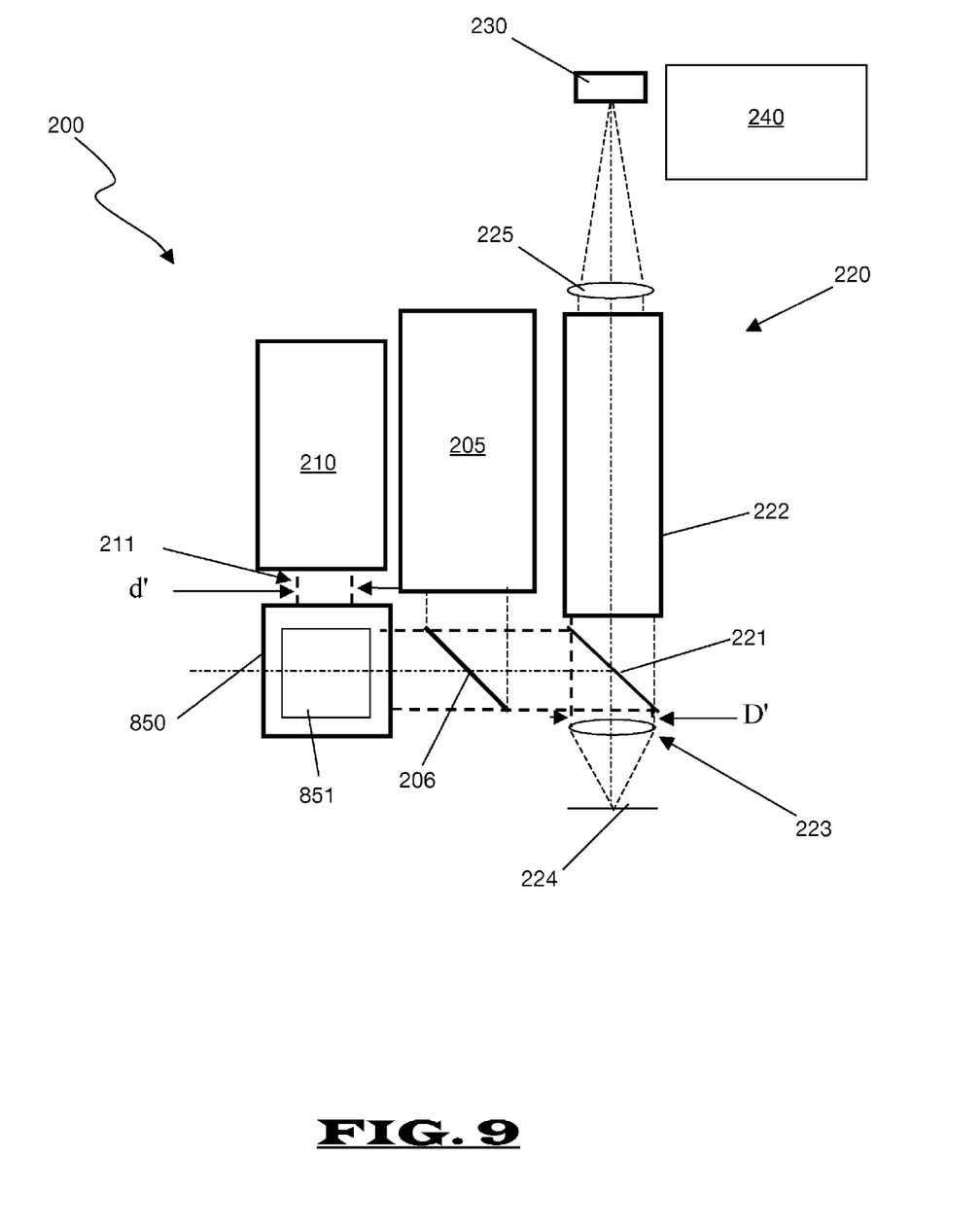
FIG. 9 shows a schematic representation of a metrology system using a TTL laser range sensor and the folded adapter of FIG. 8.

To further reduce the size of the adapter 250, mirrors can be employed to create a folded adapter 850 as seen, for example, in FIGS. 8 and 9. In FIG. 8, the first, lens 852 sends radiation to a first mirror 854, which directs radiation to a second mirror 855, which sends the radiation through the second, resolving lens 853 and out of the adapter 850. Using such a folded arrangement of the laser range sensor adapter 250, the volume and length of the adapter can be reduced. Further, the folded adapter 850 can be used to allow a more compact arrangement of the TTL sensor system 210 since the adapter 850 can effectively bend the radiation 211 of the TTL system 210 at a right angle, as seen in FIG. 9. More or fewer mirrors can be employed to alter the size of the adapter and the angle between entry and exit of the radiation as desired or appropriate for a given TTL sensor system and metrology hardware.

Figure 10:
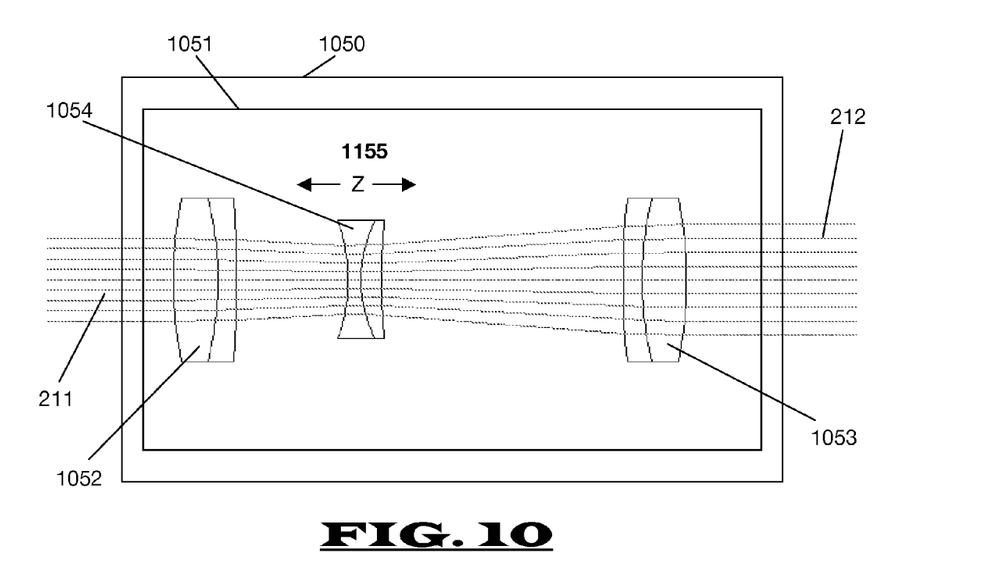
FIG. 10 shows a schematic representation of an adjustable adapter according to embodiments.

Additionally, embodiments can include an adjustable adapter 1050 with an adjustable optics system 1051, which is preferably an afocal zoom system, a very simple example of which is shown in FIG. 10. Such an adjustable system 1051 can expand or contract a collimated beam using first and second positive lenses 1052, 1053, but includes at least one extra lens 1054 between the first and second lenses 1052, 1053. While the simple example of FIG. 10 includes a single moving doublet lens, the at least one extra lens 1054 can be a single central lens, such as a doublet diverging lens, or a group of lenses. More than one lens could be used to increase the expansion or contraction ratio and/or balance monochromatic and/or chromatic aberrations. These additional lenses can be both fixed and moving, depending on the nature of the desired expansion/contraction ratio and aberration balancing. An actuator 1055 is arranged to move the movable elements of the at least one extra lens 1054, enabling movement of the at least one extra lens 1054 along the optical path of the adapter, as indicated by the z axis in FIG. 10. The actuator 1055 can be manual or powered, mechanical or electromechanical. For example, the actuator could be a slide system, a rack and pinion system, a rotated cam system, or another suitable system to change the position of the moving elements of the at least one extra lens 1054. Radiation 211 thus enters the adapter 1050 and optics 1051 and is focused by the first lens 1052, enters the at least one extra lens 1054, which diverges the radiation before it enters and passes through the second lens 1053. The second lens 1053 resolve the radiation into the desired size before it exits the optics 1051 and adapter 1050.

Figure 11:
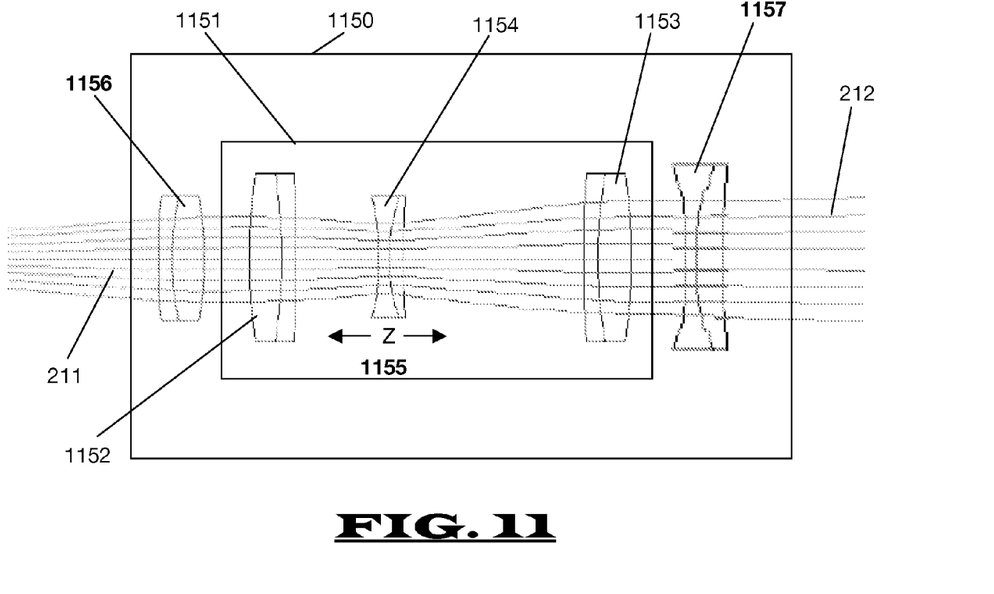
FIG. 11 shows a schematic representation of an adjustable adapter usable with non-collimated radiation according to embodiments.

The afocal zoom optical system of the adjustable adapter 1050 is best suited for use with collimated radiation. However, there are laser range systems that emit and collect divergent or convergent radiation. To enable use of the adapter with such divergent or convergent beams of light, embodiments can include a positive or negative lens, respectively, of the proper focal length prior to the afocal zoom system. Such a modified adapter is shown in FIG. 11 and includes a positive lens 1156 before the at least one extra lens 1154 of the adapter optics 1151. In addition, where a divergent or convergent exit beam is desired, a negative or positive lens, respectively, of the proper focal length can be added after the afocal zoom lens to modify the output of the afocal zoom lens. The exemplary system of FIG. 11 includes a divergent lens 1157 that diverges the radiation exiting the second lens 1153. As described above, the positive lens 1156 could be replaced with a negative lens to condition converging radiation. Similarly, the negative lens 1157 could be replaced with a positive lens to condition the exit beam from the second lens 1153 into a converging beam. In addition, the adjustable optics system 1051 can be folded in a fashion similar to the example shown in FIG. 8, but it will take up more volume than the system of FIG. 8.

Figure 7:
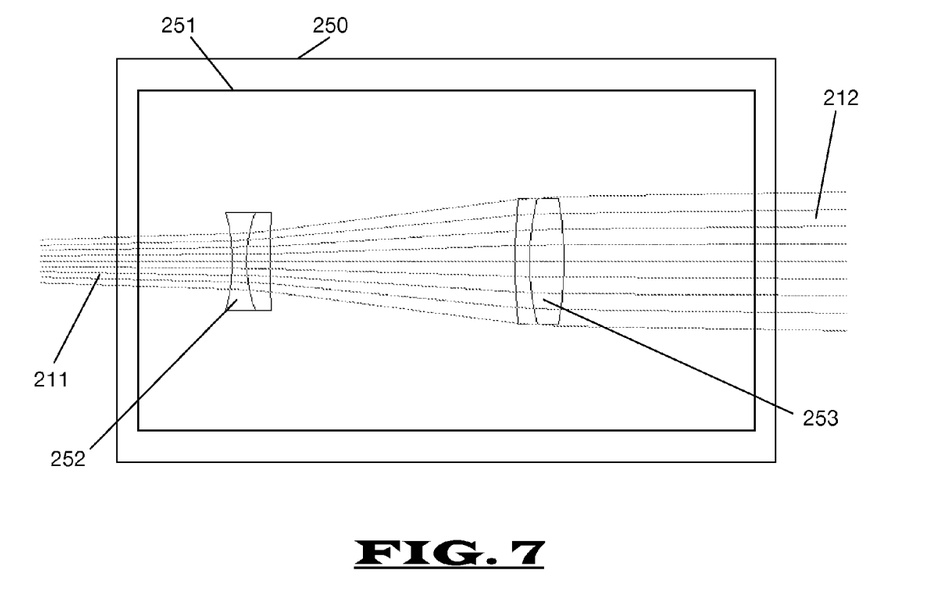
FIG. 7 shows a schematic representation of a beam expander according to embodiments as it works with non collimated beams.
Figure 12:
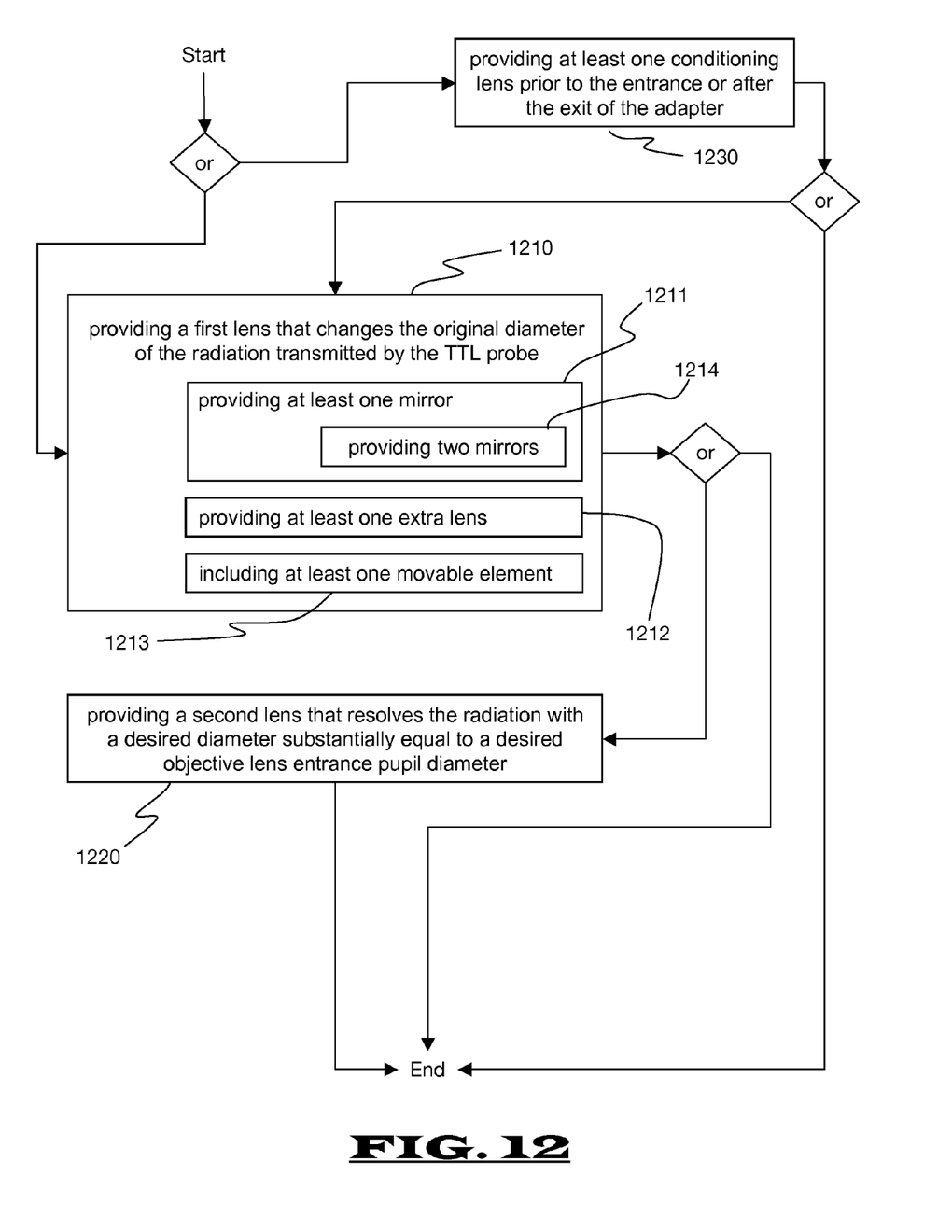
FIG. 12 is a schematic representation of a method of adapting the output of a TTL laser range sensor probe to an objective of a zoom lens system for which the probe was not designed according to embodiments.

Embodiments thus comprise a method of using a TTL probe having an original exit pupil size with an optical system employing an objective requiring a different, desired entrance pupil size as entered from the laser range sensor, the TTL probe emitting, and receiving, radiation through the original diameter of the exit pupil. The method, as shown schematically in FIG. 12, can comprise providing a first lens that changes the original diameter of the radiation transmitted by the TTL probe (block 1210) and/or providing a second lens that resolves the radiation with a desired diameter substantially equal to a desired objective lens entrance pupil diameter (block 1220). Either or both of these can be employed. In addition, providing at least one conditioning lens prior to the entrance of or after the exit of the adapter (block 1230) can be included in the method before block 1210, before block 1220, or on its own. In embodiments, providing a first lens (block 1210) can additionally comprise providing at least one mirror (block 1211), providing at least one extra lens (block 1212), and/or including at least one movable element (block 1213). Again, any, any combination, or all of these can be included. In particular embodiments, providing at least one mirror (block 1211) preferably includes providing two mirrors (block 1214). Providing a first lens can, for example, include providing a diverging lens, and providing a second lens can, for example, include providing a converging lens, the adapter thus expanding the radiation as seen in FIGS. 3 and 7. Alternatively, in the method of embodiments, providing a first lens can include providing a converging lens and providing a second lens can include providing a diverging lens, the adapter thus contracting the radiation as seen in FIG. 4. In a third alternative according to embodiments, providing a first lens can include providing a converging lens and providing a second lens can include providing a converging lens beyond an intermediate focus between the first and second lenses as seen, for example, in FIGS. 5 and 6.

Providing at least one mirror preferably includes arranging the at least one mirror between the first and second lenses, the at least one mirror reflecting light from the first lens to the second lens. As seen in FIGS. 8 and 9, for example, providing at least one mirror can particularly comprise providing two mirrors such that radiation passes through the first lens to a first mirror reflecting the radiation to a second mirror reflecting the radiation through the second lens and out of the adapter. The angle between radiation entering the adapter and radiation leaving the adapter is preferably substantially ninety degrees, though other angles can be employed if required or desirable.

Providing at least one extra lens between the first and second lenses preferably includes at least one movable element to enable adjustment of the output of the adapter, as seen in FIGS. 10 and 11. An actuator can be provided for the at least one movable element. Providing a first conditioning lens can include placing the first conditioning lens between an entrance of the adapter and the at least one extra lens that receives non-collimated radiation and alters the radiation for the at least one extra lens. Additionally, providing a first or second conditioning lens can include placing the conditioning lens between the at least one extra lens and the exit of the adapter that receives radiation from the at least one extra lens and alters the radiation for exit from the adapter. Both a first and a second conditioning lens are shown as an example in FIG. 11.

It will be appreciated that various of the above-disclosed and other features and functions, or alternatives thereof, may be desirably combined into many other different systems or applications. It will also be noted that various presently unforeseen or unanticipated alternatives, modifications, variations or improvements therein may be subsequently made by those skilled in the art which are also intended to be encompassed by the following claims.

What is claimed is:

1. In an optical system including a through the lens laser range sensor and a zoom optical apparatus sharing an objective lens requiring TTL laser range sensor radiation at an objective lens entrance pupil, the laser range sensor having an exit pupil from which it emits radiation and through which radiation returns for detection, a laser sensor adapter comprising a first lens that selectively receives radiation emitted by the through the lens laser range sensor at a first size and a second lens that receives the radiation from the first lens and resolves the beam at a second size at which TTL laser range sensor radiation substantially optimally fills the objective lens entrance pupil.

2. The adapter of claim 1 wherein the first lens is a diverging lens and the second lens is a converging lens, the adapter thus expanding the radiation.

3. The adapter of claim 1 wherein the first lens is a converging lens and the second lens is a diverging lens, the adapter thus contracting the radiation.

4. The adapter of claim 1 wherein the first and second lenses are both converging lenses with an intermediate focus therebetween.

5. The adapter of claim 1 further comprising at least one mirror arranged between the first and second lenses reflecting light from the first lens to the second lens.

6. The adapter of claim 5 wherein the at least one mirror comprises two mirrors.

7. The adapter of claim 6 wherein radiation passes through the first lens to a first mirror, which reflects the radiation to a second mirror, which reflects the radiation through the second lens and out of the adapter.

8. The adapter of claim 7 wherein an angle between radiation entering the adapter and radiation leaving the adapter is substantially ninety degrees.

9. The adapter of claim 1 further comprising at least one extra lens between the first and second lenses, the at least one extra lens including at least one movable element to enable adjustment of the output of the adapter.

10. The adapter of claim 9 further comprising a first conditioning lens between an entrance of the adapter and the at least one extra lens that receives non-collimated radiation and alters the radiation for the at least one extra lens.

11. The adapter of claim 9 further comprising a second conditioning lens between the at least one extra lens and the exit of the adapter that receives radiation from the at least one extra lens and alters the radiation for exit from the adapter.

12. In a metrology system including a TTL laser range sensor probe with an exit pupil from which it emits radiation toward and receives radiation from an optical system, the optical system including an objective and a zoom lens system with an objective lens requiring a desired diameter of the radiation that is different from an original diameter of the TTL laser range sensor as transmitted through the exit pupil, an adapter comprising a first lens that changes the radiation from the original diameter and a second lens that resolves the radiation at the desired diameter, the desired diameter substantially optimally filling an objective entrance pupil.

13. The adapter of claim 12 wherein the first lens is a diverging lens and the second lens is a converging lens, the adapter thus expanding the radiation.

14. The adapter of claim 12 wherein the first lens is a converging lens and the second lens is a diverging lens, the adapter thus contracting the radiation.

15. The adapter of claim 12 wherein the first and second lenses are both converging lenses with an intermediate focus therebetween.

16. The adapter of claim 12 further comprising at least one mirror arranged between the first and second lenses reflecting light from the first lens to the second lens.

17. The adapter of claim 16 wherein the at least one mirror comprises two mirrors.

18. The adapter of claim 17 wherein radiation passes through the first lens to a first mirror, which reflects the radiation to a second mirror, which reflects the radiation through the second lens and out of the adapter.

19. The adapter of claim 18 wherein an angle between radiation entering the adapter and radiation leaving the adapter is substantially ninety degrees.

20. The adapter of claim 12 further comprising at least one extra lens between the first and second lenses, the at least one extra lens including at least one movable element to enable adjustment of the output of the adapter.

21. The adapter of claim 20 further comprising a first conditioning lens between an entrance of the adapter and the at least one extra lens that receives non-collimated radiation and alters the radiation for the at least one extra lens.

22. The adapter of claim 20 further comprising a second conditioning lens between the at least one extra lens and the exit of the adapter that receives radiation from the at least one extra lens and alters the radiation for exit from the adapter.

23. A method of using a TTL probe with an original exit pupil size with an optical system employing an objective requiring a different, desired entrance pupil size as entered from the laser range sensor, the TTL probe emitting, and receiving, radiation through the original diameter of the exit pupil, the method comprising:
   providing a first lens that changes the original diameter of the radiation transmitted by the TTL probe; and
   providing a second lens that resolves the radiation with a desired diameter substantially equal to a desired objective lens entrance pupil diameter.

24. The method of claim 23 wherein providing a first lens comprises providing a diverging lens and providing a second lens comprises providing a converging lens, the adapter thus expanding the radiation.

25. The method of claim 23 wherein providing a first lens comprises providing a converging lens and providing a second lens comprises providing a diverging lens, the adapter thus contracting the radiation.

26. The method of claim 23 wherein providing a first lens comprises providing a converging lens and providing a second lens comprises providing a converging lens beyond an intermediate focus between the first and second lenses.

27. The method of claim 23 further comprising providing at least one mirror, arranging the at least one mirror between the first and second lenses, the at least one mirror reflecting light from the first lens to the second lens.

28. The method of claim 27 wherein providing at least one mirror comprises providing two mirrors such that radiation passes through the first lens to a first mirror reflecting the radiation to a second mirror reflecting the radiation through the second lens and out of the adapter.

29. The method of claim 28 wherein an angle between radiation entering the adapter and radiation leaving the adapter is substantially ninety degrees.

30. The method of claim 23 further comprising providing at least one extra lens between the first and second lenses, the at least one extra lens including at least one movable element to enable adjustment of the output of the adapter.

31. The method of claim 30 further comprising providing a first conditioning lens between an entrance of the adapter and the at least one extra lens that receives non-collimated radiation and alters the radiation for the at least one extra lens.

32. The method of claim 30 further comprising providing a second conditioning lens between the at least one extra lens and the exit of the adapter that receives radiation from the at least one extra lens and alters the radiation for exit from the adapter.

* * * * *